UNITED STATES PATENT OFFICE.

CHARLES MARCHAND, OF NEW YORK, N. Y., ASSIGNOR, BY MESNE ASSIGNMENTS, TO LOUIS N. DEPEYRE, OF COLORADO SPRINGS, COLORADO.

PROCESS OF MAKING STERILIZED GRANULATED MEAT FIBER.

1,167,193. Specification of Letters Patent. Patented Jan. 4, 1916.

No Drawing. Application filed March 14, 1907, Serial No. 362,435. Renewed November 22, 1915. Serial No. 62,916.

*To all whom it may concern:*

Be it known that I, CHARLES MARCHAND, a citizen of the United States, residing at 57 Prince street, in the city of New York, county of New York, and State of New York, have invented certain new and useful Improvements in Processes of Making Sterilized Granulated Meat Fiber; and I do hereby declare the following to be a full, clear, and exact description of the invention, such as will enable others skilled in the art to which it appertains to make and use the same.

Heretofore, it has been found impossible to successfully produce a granulated dry beef or other meat as a food product which would keep for any length of time under varying conditions without the addition of preservatives and other injurious substances.

After extensive experimenting I have discovered that granulated dry beef or other meat can be produced and preserved for an indefinite length of time without the addition of preservatives to such dried meat by carrying out the following process: The fresh lean meat is reduced to the condition of a fine pulp. The pulp is then macerated in a diluted solution of hydrochloric acid, the strength of the solution depending upon the rapidity with which it is desired to carry out the process; as for instance if it is desired to carry forward the process rapidly I employ a solution of 5 per thousand parts of hydrochloric acid. Where it is desired to carry forward the process slowly I employ a solution of 1 per thousand parts of hydrochloric acid in water. Subsequently, say about an hour, 0.2 to 0.4% or more of peroxid of hydrogen free from barium salts or other injurious substances is added. At the expiration of from five to ten hours the meat fiber has reached the condition of a thick gelatinous mass. The length of time will depend upon the strength or weakness of the solution of the hydrochloric acid and the temperature. For practical purposes the temperature is usually attained at 25 degrees centigrade.

The employment of a dilute solution of hydrochloric acid alone will transform the meat into a gelatinous condition but will not arrest putrefaction. I have discovered that by the addition of peroxid of hydrogen to the solution of hydrochloric acid putrefaction is arrested and that the peroxid of hydrogen does not decompose rapidly. I then neutralize the hydrochloric acid by adding a solution of soda of sufficient strength and quantity to accomplish that purpose. The subjecting of the macerated mass to the action of the acid tends to gelatinize the mass and therefore destroy the fibrous aspect of the material. When the acidity has been neutralized the gelatinization is reduced and the meat content is restored to its fibrous consistency—that is to say, substantially to its original condition or primary state. I then add to the batch 0.3% or more of peroxid of hydrogen stir well and heat the mixture at a temperature of about 40° C. so as to melt the fatty substance. This being done the meat fiber is allowed to settle for a few hours and cool off. The fatty substances rise to the top of the mass. The fat is then skimmed off or otherwise removed. The juice of the beef thus separated is drawn off, leaving only the nutritious part of the meat, that is to say proteid or fibrin. The mass is then passed through a centrifugal machine or filter press and dried to a temperature not exceeding 40° C.

It will be readily obvious to those skilled in the art that instead of the use of carbonate of soda or soda followed by peroxid of hydrogen, peroxid of sodium may be employed with the resultant reaction of neutralizing the hydrochloric acid and at the same time producing peroxid of hydrogen in the mass. This however is considered by me as a mere chemical alternative. It is then ground as fine as desired, and it is then ready for the market. It may be flavored if desired. The result is the production of a granulated nitrogenous food which is of a light yellowish color, substantially odorless, of a palatable flavor and free from preservative and injurious substances. It will be found to contain from 74 to 78% of assimilable proteid, and I have found that from some parts of beef I am able to obtain as high as 82% nitrogenous food, the percentage of nitrogenous food or proteid naturally varying slightly with the different parts of the beef employed in the process. The percentage of ash resulting from calcination does not exceed 2% which is due to the fact that a large percentage of mineral substance contained in the meat has been eliminated in carrying out the process.

As stated above another important feature of the process is that the product does not deteriorate with age or under ordinary conditions of exposure and change of temperature.

A careful analyzation of one batch of the product of the present improved process shows substantially the following analysis:

| | |
|---|---|
| Water | 6.85% |
| Proteids insoluble in hot water | 68.73% |
| Proteoses, gelatinoids, etc. | 1.69% |
| Meat bases, etc. | 8.18% |
| Fat | 12.20% |
| Crude fiber (approximately) | .30% |
| Ash (mineral matter, free from sodium chlorid) | 2.00% |
| Sodium chlorid | .05% |

The constituents will naturally vary slightly owing to the different amount of nitrogenous food found in different portions of beef.

While for the purposes of illustration I have mentioned specifically hydrochloric acid as the meat reducing agent and beef as the specific meat preferred, it is obvious that the invention is comprehensive of the use of any acid susceptible of performing the functions desired and any meat in addition to beef.

What I claim is:

1. The process of producing granulated meat fiber consisting in macerating meat pulp in an acidulated bath until it is gelatinous, neutralizing the acidulated mass, adding a material to prevent putrefaction, melting and removing the fat, removing the moisture from the mass and reducing to granular form.

2. The process of producing granulated meat fiber consisting in macerating meat pulp in a hydrochloric acid bath at about 25° C. until it is gelatinous, neutralizing the acidulated mass by the addition of an alkali, adding a material to prevent putrefaction, heating to about 40° C. to melt the fat, removing the moisture from the fat and mass and reducing to granular form.

3. The process of producing granulated meat fiber consisting in macerating meat pulp in dilute hydrochloric acid until it is gelatinous, neutralizing the acidulated mass by the addition of an alkali, adding hydrogen peroxid, heating to about 40° C. to melt the fat, removing the fat and moisture from the mass and reducing to granular form.

4. The process of producing granulated meat fiber consisting in macerating meat pulp in dilute hydrocholic acid at about 25° C. until it is gelatinous, neutralizing the acidulated mass by the addition of an alkali, adding hydrogen peroxid, heating to about 40° C. to melt the fat, removing the fat and moisture from the mass and reducing to granular form.

5. The process of producing granulated meat fiber consisting in macerating meat pulp in an acidulated bath until it is gelatinous, neutralizing the acidity of the mass, removing the fat and moisture and reducing to granular form.

6. The process of producing a desiccated meat fiber mass consisting in gelatinizing lean meat, adding a material to prevent putrefaction and extracting the moisture.

7. The process of producing a desiccated meat fiber mass consisting in gelatinizing lean meat, adding a peroxid to prevent putrefaction and extracting the moisture.

8. The process of producing a desiccated meat fiber mass consisting in gelatinizing meat pulp, adding a material to prevent putrefaction, and extracting the fat and moisture.

9. The process of producing a desiccated meat fiber mass consisting in gelatinizing meat pulp, adding a peroxid to prevent putrefaction, and extracting the fat and moisture.

10. The process of producing a meat fiber mass consisting in gelatinizing lean meat in an acidulated bath, adding a peroxid to prevent putrefaction, neutralizing the acidity, melting and removing the fat, and extracting the moisture.

11. The process of producing a desiccated meat fiber mass consisting in gelatinizing lean meat, adding a material capable of liberating nascent oxygen to prevent putrefaction, and extracting the moisture.

12. The process of producing desiccated meat fiber consisting in gelatinizing lean meat, extracting the moisture and maintaining the mass in an antiseptic condition throughout such steps.

13. The process of producing a desiccated meat fiber mass consisting in gelatinizing lean meat, extracting the moisture and maintaining the mass in an antiseptic condition throughout the process by the use of material which has disappeared at the termination of the process.

In testimony whereof I affix my signature in presence of two witnesses.

CHARLES MARCHAND.

Witnesses:
HARRY O. ADAMS.
EDWARD S. FENWICK.